D. ALLENSON.
FOLDING BED ATTACHMENT FOR AUTOMOBILES.
APPLICATION FILED FEB. 27, 1918.
1,313,870.
Patented Aug. 26, 1919.
2 SHEETS—SHEET 1.
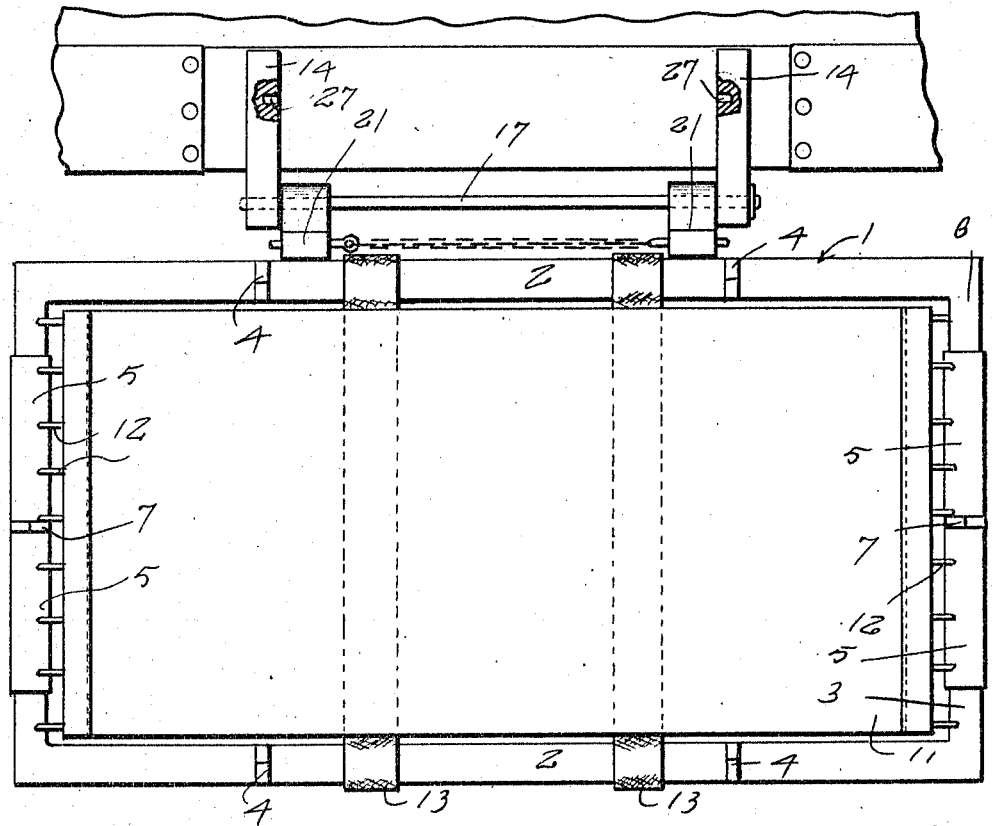
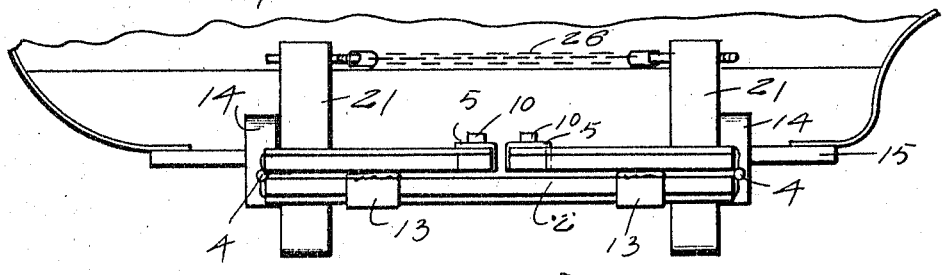

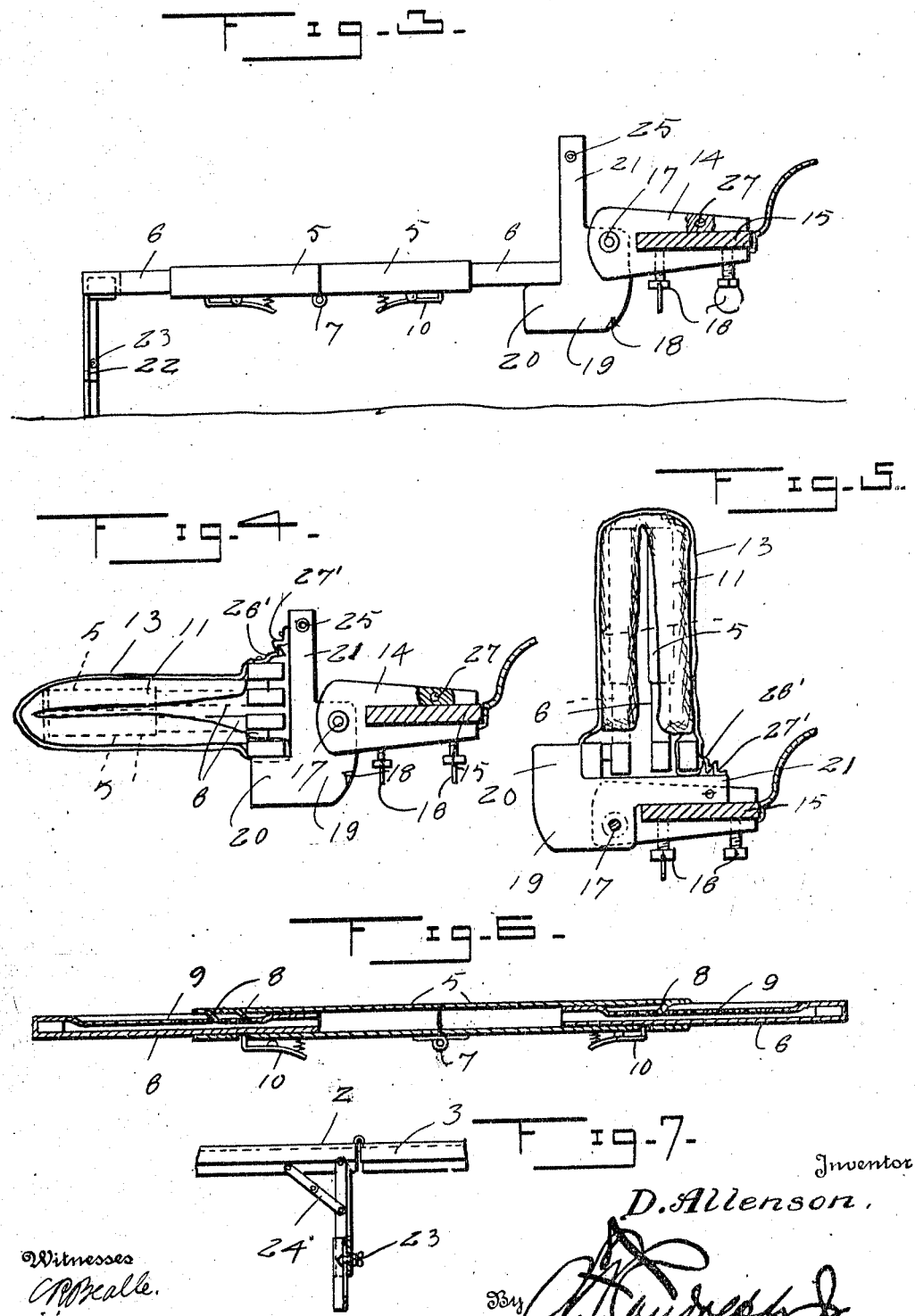

UNITED STATES PATENT OFFICE.

DAVID ALLENSON, OF RILEY, KANSAS.

FOLDING-BED ATTACHMENT FOR AUTOMOBILES.

1,313,870.  Specification of Letters Patent.  Patented Aug. 26, 1919.

Application filed February 27, 1918. Serial No. 219,459.

*To all whom it may concern:*

Be it known that I, DAVID ALLENSON, a citizen of the United States, residing at Riley, in the county of Riley and State of Kansas, have invented certain new and useful Improvements in Folding-Bed Attachments for Automobiles; and I do hereby declare the following to be a full, clear, and exact description of the invention, such as will enable others skilled in the art to which it appertains to make and use the same.

This invention relates to improvements in folding bed attachments for automobiles and has for one of its objects the provision of a device of this character which can be readily attached to an automobile, and carried in a folded position, and which can be conveniently unfolded so that the same can be slept upon when desired.

Another object of this invention is the provision of a collapsible bed frame so connected to the running board of an automobile that the same can be folded together and swung upon the running board in a compact article so as not to occupy a large space upon the running board and thereby not interfere with the entering or exiting from the automobile.

A further object of this invention is the provision of a novel means for detachably securing the bed frame to the running board so that the same can be readily removed therefrom when desired.

A still further object of this invention is the provision of a folding bed attachment for automobiles of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a plan view of a folding bed attachment for automobiles constructed in accordance with my invention, Fig. 2 is a side elevation of the bed attached to the running board and partly folded Fig. 3 is an end elevation partly in section of the bed in an extended position, Fig. 4 is an end elevation partly in section of the bed frame in a folded position prior to being placed or swung onto the running board of the automobile, Fig. 5 is a similar view of the bed swung onto the running board, Fig. 6 is a sectional view illustrating the adjustment of the bed frame, Fig. 7 is a fragmentary sectional view illustrating the extensible legs for supporting the bed, Fig. 8 is a fragmentary sectional view illustrating the means for locking the bed in a folded position upon the running board.

Referring in detail to the drawings, the numeral 1 indicates as an entirety a collapsible or folding bed frame, consisting of side members 2 and end members 3. Each of the side members 2 consist of intermediate sections and outer sections that are hinged together as illustrated at 4, permitting the end sections to be folded onto the intermediate section. The end members 3 consist of telescopic sections 5 and 6. The sections 5 are hinged together as illustrated at 7 and have struck out therefrom tongues 8 which engage in notches 9 carried by the sections 6 so that the sections may be adjusted in relation to the sections 5 and will be held against accidental movement. The sections 5 are provided with spring actuated catches 10 which are adapted to engage within spaced recesses in the sections 6 so as to lock the sections 6 against movement in relation to the sections 5. Fabric 11 has each end secured to the end members 3 of the frame 1 by fastening means 12 and is supported intermediate its ends by means of straps 13 that are secured to the side members 2 and underlie the fabric as clearly illustrated in Fig. 1 forming an efficient bed when the frame is in an unfolded or bed forming position.

A pair of clamps 14 are secured to the running board 15 of an automobile by means of set screws 16 and are connected by a rod 17 that extends parallel with the running board and slightly spaced therefrom. Supporting members 18 are journaled on the rod 17 adjacent the clamps 14 and each consists of a body portion 19 having extensions 20 and 21. The extensions 20 have one of the side members 2 of the frame 1 secured thereto in any well known manner. The extensions 20, when the device is in bed forming position, are disposed horizontally so as to support one side of the bed, while the opposite side of the bed is supported by adjustable legs 22 which consist of telescopic sections that are held against movement in relation to each other by set screws 23. The legs are pivoted to the outer side member of the bed frame 1 so that the legs may be swung upwardly or folded against the bed when desired. Collapsible braces 24 are pivoted to the bed frame and to the legs for bracing said legs to prevent them from collapsing while in use. When the frame 1 is in bed forming position as illustrated in Fig. 3, the extensions 21 are disposed vertically and have mounted on their upper ends spring actuated catches 25 that are connected together by a chain 26. These catches are adapted to engage in the recesses or keepers 27 in the clamps 14 when the members 18 are swung onto the running board to prevent them from moving or swinging to bed forming position, while the device is in non-use and being carried upon the running board of the automobile. Spring catches 26' are carried by the bed frame and are adapted to engage spring catches 27' upon the clamping members 14 when the bed is in a folded position upon the running board to prevent the same from falling therefrom during the traveling of the automobile.

In operation, when the device has been applied to the running board of an automobile and it is desired to form a bed, the catches 26 and 25 are disengaged from their respective keepers 27. The members 18 are then swung to a position as illustrated in Fig. 3 and the frame is unfolded into bed forming position permitting the legs to depend downwardly in engagement with the ground for supporting the outer longitudinal edge of the bed so that a mattress and other bed clothing may be placed upon the bed.

The hinges that connect the various sections of the bed frame together are of sufficient size to permit the bed frame to be folded without removing the bed clothing and mattress if desired. When desiring to fold the bed frame the ends are swung inwardly onto the intermediate sections of the side members 2 and the outer side member is then swung over upon the inner side member as illustrated in Fig. 4. The members 18 are then swung onto the running board positioning the bed in a collapsed position as illustrated in Fig. 5 upon the running board. A suitable cover may then be placed over the bed when in a folded position upon the running board to protect the same from dirt and other foreign matter. If desired, a chain or cable may be connected to the chain 26 and carried to the inside of the automobile for releasing the catches 25 so that the members 18 may fall into bed forming position when desiring to enter the car from the side that has the bed attachment applied thereto.

While I have shown and described the preferred embodiment of my invention, it will be understood that minor changes in construction, combination, and arrangement of parts may be made, without departing from the spirit and scope of the invention as claimed.

Having thus described my invention, what I claim is:

A bed attachment for automobiles including a collapsible bed, supporting members consisting of body portions having extensions and shoulders and having said bed secured to the shoulders, a rod connecting the body portions of said members, clamps journaled to the bed and secured to the running board of an automobile, said extensions adapted to rest on the running board when the bed is folded thereon, and spring catches secured to the extensions and bed and coöperating with each other in securing the bed to said extensions when folded.

In testimony whereof I affix my signature in presence of two witnesses.

DAVID ALLENSON.

Witnesses.
 T. P. JONES,
 WILL G. THOMPSON.